United States Patent [19]

Fox

[11] 3,971,297

[45] July 27, 1976

[54] TWO CYCLE ENGINE WITH PERIPHERAL BYPASS FOR PISTON HEAD AND METHOD OF MANUFACTURE

[75] Inventor: Duke M. Fox, Fort Smith, Ark.

[73] Assignee: Fox Manufacturing Company, Fort Smith, Ark.

[22] Filed: May 24, 1974

[21] Appl. No.: 473,074

[52] U.S. Cl. .......... 92/169; 92/162 R; 92/261; 123/73 PP; 123/73 A

[51] Int. Cl.$^2$ .......... F16J 11/02

[58] Field of Search .......... 92/169, 162 R, 162 P, 92/261; 91/399, 325; 123/73 PP, 73 A

[56] References Cited

UNITED STATES PATENTS

| | | | |
|---|---|---|---|
| 825,835 | 7/1906 | Holloway | 123/73 A |
| 996,434 | 6/1911 | Tulley | 123/73 A |
| 1,103,047 | 7/1914 | Holloway | 123/73 A |
| 2,119,121 | 5/1938 | Steinlein | 123/73 A |
| 2,146,919 | 2/1939 | Stihl | 123/73 A |
| 2,406,404 | 8/1946 | Ryde | 123/73 A |
| 2,477,374 | 7/1949 | Ide | 123/73 A |
| 3,262,433 | 7/1966 | Jordon | 123/73 A |
| 3,374,776 | 3/1968 | Hooper | 123/73 PP |
| 3,412,719 | 11/1968 | Sheaffer et al. | 123/73 A |
| 3,749,067 | 7/1973 | Kobayashi et al. | 123/73 PP |

*Primary Examiner*—Paul E. Maslousky
*Attorney, Agent, or Firm*—Laff, Whitesel & Rockman

[57] ABSTRACT

The invention provides a bypass around virtually the entire periphery of a piston in a two cycle engine without substantially increasing costs or obsoleting production tooling. This is done by reshaping a cavity formed inside an engine casting to enlarge the crank case opening and to provide three oppositely displaced bypasses. The fourth side of the piston is open to the exhaust port. Therefore, virtually the entire perimeter of the piston is bypassed to greatly increase power by improved breathing.

6 Claims, 9 Drawing Figures

TWO CYCLE ENGINE WITH PERIPHERAL BYPASS FOR PISTON HEAD AND METHOD OF MANUFACTURE

This invention relates to two-cycle engines and more particularly to two-cycle engines having a single and unitary cylinder and crank case casting with a bypass region therebetween and to the method of manufacturing it.

Two-cycle engines are widely used for such things as model airplanes, lawn mowers, chain saws, and the like. Usually, these engines are very simple devices wherein maximum power and durability at the lowest cost is about the most important single consideration. One way of improving power in these engines is to improve breathing, but this generally increases the cost.

The breathing is provided by bypass cavities around the length of a piston at the bottom of its stroke. More particularly, during most of the stroke the piston is moving through a closed cylinder. At this time, the crank case is open to the air via an exhaust port or window, to relieve back pressure. When the piston nears the bottom of its stroke, the interior of the cylinder also needs to be open to the air both for clearing out the spent post-combustion gasses and for taking in fresh air to support the next combustion cycle. Thus, at the end of the stroke, both sides of the piston should be open to the air. To accomplish this, one or more elongated cavities (called "bypasses") are formed in the bottom of the cylinder wall to span the length of the piston.

For example, a three-bypass system requires three different mutually perpendicular internal cavities within the cylinder walls, however, the core for casting an engine block with such cavities in three separate planes is usually quite complex, and this complexity increases costs. In general, the prior art has tended to use one of three approaches to obtain the three bypasses. First, a lost core such as a sand core has been used, with the added cost of forming a new core for each casting. Second, many small blocks or other cores have been inserted into a principal core with the added cost of hand labor for inserting and removing the blocks or cores. Third, the casting has been made in several parts which are bolted together, with the added problems of forming joints, alignments, or machining to make the parts fit together. Each of these and similar approaches increases cost and detracts from the advantages of two-cycle engines as compared to other engine types.

Accordingly any new concept which produces a multibypass engine by using fewer parts or lower cost parts is considered an improvement in the state of the art.

This invention provides a concept whereby a complete crankcase and cylinder housing can be made in only one piece and by techniques that produces a one piece casting, at costs no greater than costs incurred with current techniques for producing single bypass engines, and at substantially less cost than costs incurred with current techniques for producing multibypass engines.

In greater detail, an object is to provide a method of making an engine housing having three cavities, extending away from a cylinder wall in mutually perpendicular directions. Here, an object is to produce such cavities through a use of permanent cores which do not require hand loading. Another object is to make a single, and unitary casting having a cylinder, crank case and bypass region therebetween.

Yet another object of the invention is to provide a three-bypass two-cycle engine at about the same cost as heretofore required to produce a one-bypass engine.

Still another object is to substantially increase the power output from a two-cycle engine without substantially increasing the cost thereof. Here, an object is to increase the breathing efficiency of such a two-cycle engine. In particular, an object is to increase the number of bypasses in a two-cycle engine.

In keeping with an aspect of the invention, these and other objects are accomplished by providing a single casting containing both the cylinder and the crank case with a connecting wall therebetween containing the bypass cavities. The crank case access cover is extended from the crank case region into the bypass region thereby giving access for a principal core which is shaped to form a bypass in the front cylinder wall. A cylinder core, having two-piece parts, forms both the cylinder and a bypass in the side of the cylinder wall, with the cavity generally extending perpendicularly to the bypass cavity formed in the front wall. A third bypass is formed in the region covered by the crank case cover. Since all of these parts are normally required to make a one bypass engine, there is no added cost required to make a three-bypass engine. Moreover, except for a few tooling costs, no substantial capital investments are required to switch from one to three bypasses. However, the power out of the engine is substantially increased by the two added bypasses.

The nature of a preferred embodiment of the invention may be understood best from the following description of the attached drawings, wherein.

Figure 1:
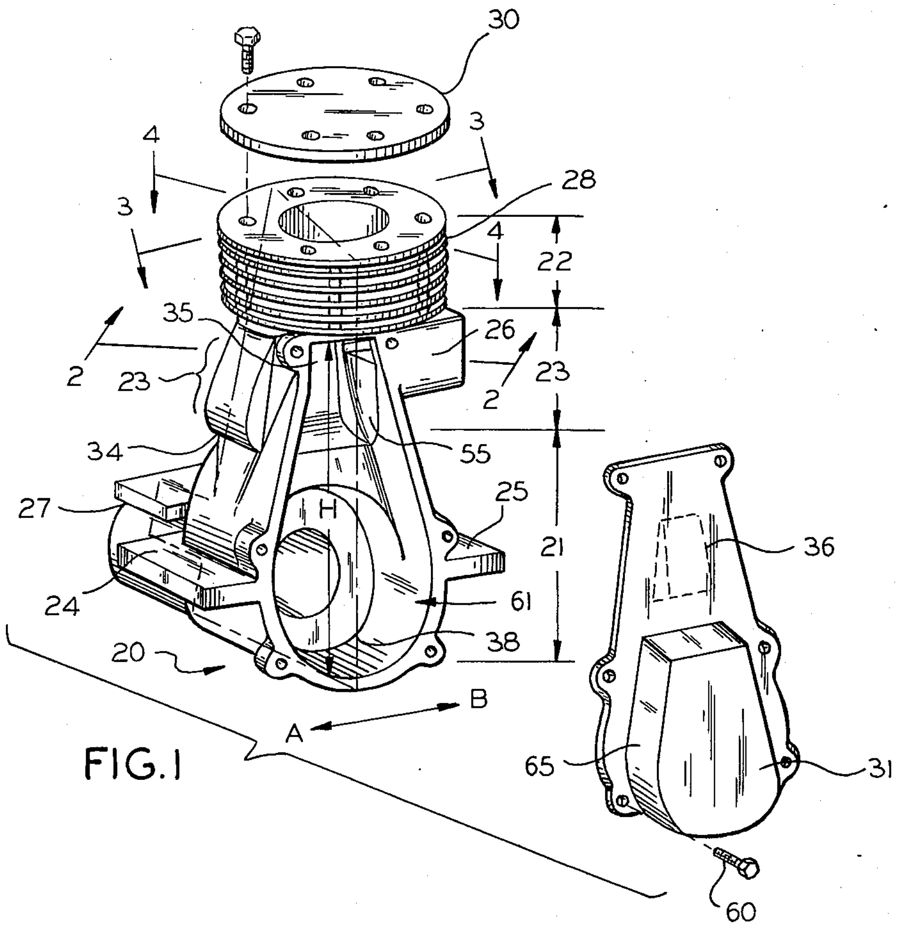
FIG. 1 is an exploded perspective view of the inventive casting with cylinder head and back cover plate removed.

In FIG. 1, the inventive casting 20 (of any suitable material, such as an aluminum alloy) comprises a crank case region 21, a cylinder region 22 and bypass region 23 therebetween. The exterior of the casting 20 includes a pair of mounting flanges 24, 25, an exhaust port or window 26, a crank shaft support bearing 27, and cooling fins 28. A cylinder head 30 bolts onto the top of cylinder 22. A crank case or back cover 31 bolts onto a flat surface formed on the back of the casting. It should be noted that cover 31 covers both the crank case region and the bypass region.

Figure 2:
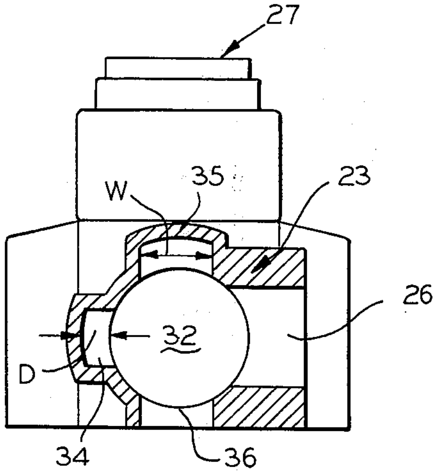
FIG. 2 is a horizontal cross-section view of the three bypass region, taken along lines 2—2 of FIG. 1.
Figure 3:
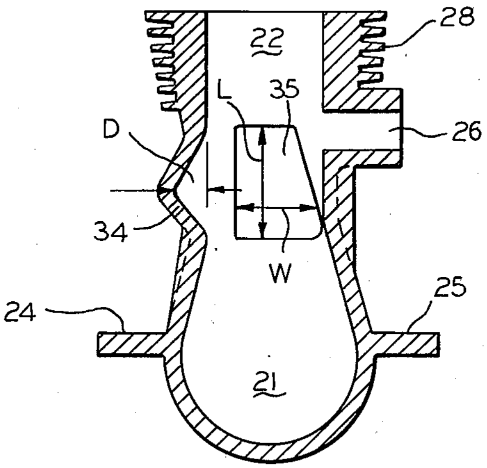
FIG. 3 is a vertical cross-section view taken along line 3—3 of the casting of FIG. 1 showing two bypasses in the front and side of the cylinder wall.
Figure 4:
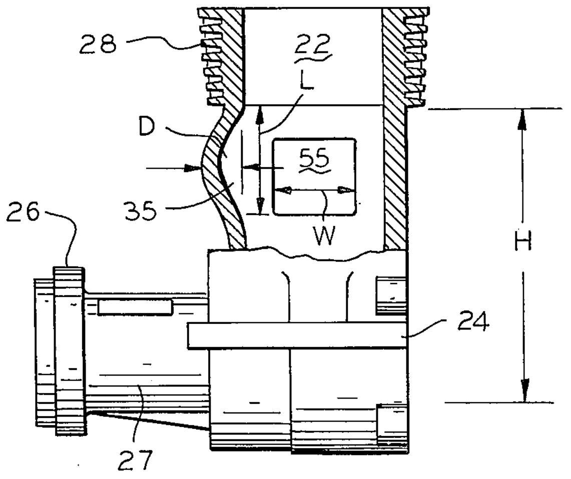
FIG. 4 is a vertical cross-section view showing two bypasses in the front and side of the cylinder wall.

The casting 20 includes the parts conventionally provided in most two cycle engines, which have not been here shown in the interest of clarity. More particularly, the interior of the casting includes a crank shaft, connecting rod, and piston 32 (FIG. 2). The crank shaft rotatably fits into and is supported by a bearing in the housing shaft tunnel 27, which may be lined by a bronze bearing cast into the housing walls. One end of the crank shaft projects beyond the end of the housing bearing tunnel 27 to receive a propeller, pulley, or the like. The other end of the crank shaft includes a crank arm which turns inside cavity region 21. The piston slides up and down in the cylinder region 22 with motion transmitted between cylinder and crank shaft by a suitable connecting rod. Any suitable fuel and ignition parts may also be provided. All of those parts and other similar parts (not shown) are entirely conventional.

In between the crank case 21 and cylinder 22 is the bypass region 23 having three cavities 34–36 (FIG. 2) extending away from the cylinder wall in mutually perpendicular directions. Each bypass has a length L such that there is an open passage extending between the crank case 21 and the cylinder 22 when the piston is the furtherest withdrawn at the bottom of its stroke. When the piston begins its upward travel, spent gas is forced out the exhaust port or window 26. Thereafter, the top of the piston leaves the bypass region to compress gas inside the cylinder 22, in the normal manner of a two stroke engine. The width W and depth D of the bypasses are selected on a basis of breathing and exhausting requirements and for producing maximum power.

The entire casting 20 is made as a unit in a simple two-part mold which separates along a parting line shown by a dot-dashed line 38 (FIG. 1). Therefore, all of the interior contours of the mold forming the outside of the casting have a suitable draft to enable the mold halves to be withdrawn in the directions A, B, respectively.

The bypass cavities are made by one or more cores inserted into the mold, these cores have mutually perpendicular projections which cannot be simply withdrawn from the cavity.

According to the invention, the back of the casting 20 is made with an opening having a height H which extends from the bottom of the crank shaft region to a point above the bypass region. This opening is made by a core 40 (FIG. 5) in the shape of the interior of the engine. This core is inserted through a clearance between the mold halves prior to casting so that the interior of the casting will be hollow when core 40 is withdrawn therefrom. Accordingly, the contours of core 40 must also have a suitable draft to insure an easy withdrawal.

Heretofore, the core 40 has had a contour, as generally shown below the dot-dashed line 41, with an old height OH. A result is that the prior art crank case or rear cover was generally circular with a diameter slightly larger than OH. According to the invention, the shape of the core 40 is modified by an addition of material in the shape and size shown above the dot-dashed line, with the new height H, thereby adding a height H-OH which approximately equals the desired length L of a bypass. The new front region 42 of the core is somewhat rounded with a height L, width W, and depth D, in the desired internal shape of the bypass cavity 35, with contours which lead to turbulent free breathing. Hence, the front bypass cavity is made by inserting or removing the core 40 in directions C, E. Since it is the same as the presently used core with the added top portion, there is no added cost in manufacture except for the tooling cost to make the core.

The second or side wall bypass 34 is made by a two-part core 45 (FIGS. 8, 9), This core 45 includes a left part 46 and a right part 48, with the two-parts sliding along a mutually contained guide way or dove tail spline 49. In cross-section (FIG. 8), the combined core 45 includes a top part 51 having a diameter equal to the inside diameter of the cylinder 22. Core 45 includes an edge 50 which forms the area on the top of the cylinder to which the head 30 is bolted. The bottom of part 51 includes the two legs 52, 53 separated by a tunnel 54 having a width suitable for receiving the core 40. The left leg 53 is shaped to carry the contours of the cylinder downwardly at 55 (FIG. 1) past the exhaust port 26. The right leg 52 includes an enlargement 56 having length, width, and depth for forming the side wall bypass cavity 34. Again, the core 45 is normally used to make the single bypass in the old style two cycle region casting; therefore, this cavity does not add any substantial cost to the new style engine.

To remove the core 45 from the mold, the left side 46 is slid upwardly (as viewed in the drawings) until after leg 53 clears the top of the cylinder 22. Since core 40 has already been withdrawn, the enlargement 56 is not able to continue to hold the casting 20, and it generally falls off. If not, a slight amount of force quickly dislodges the casting.

Figure 6:
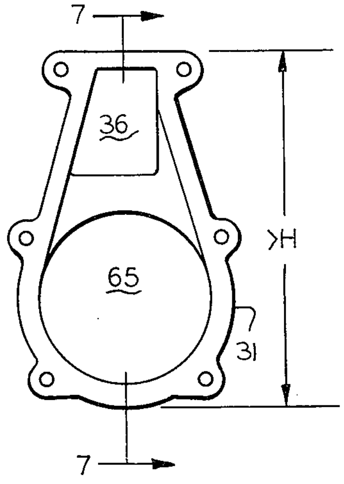
FIG. 6 is a vertical elevation view of the back or crank case cover showing a bypass in the rear of the cylinder.
Figure 5:
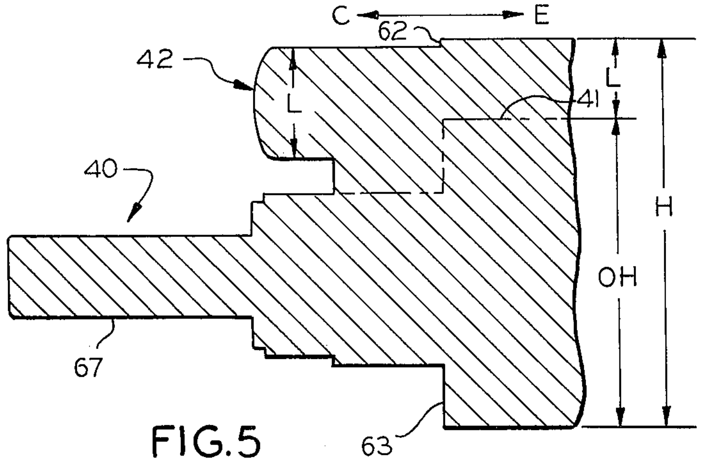
FIG. 5 is a cross-section representation of a core which may be used to make the front wall bypass in the inventive casting.
Figure 7:
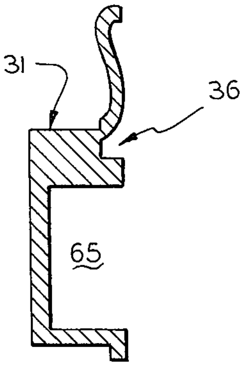
FIG. 7 is a cross-section view taken along line 7—7 of FIG. 6 showing the back cover and the bypass therein.

The crank case or rear cover 31 (FIGS. 6, 7) has a height H which is slightly greater than the height H of the core 40 (FIG. 5). Thus, when the cover 31 is placed over the back opening formed by the core 40, a suitable number of bolts 60 (FIG. 1) may be used to bolt it onto a flat surface 61 formed by the shoulders 62, 63 of the core 40. The back opening itself forms much of the rear bypass cavity 36.

The back cover 31 is also formed with a cup-shaped relief area 65 which receives the end of the crank shaft. In the cover plate 31 above the relief area 65 is a portion of the bypass cavity 36. Thus, when the back cover plate is bolted in place, the three bypasses 34, 35, 36 are positioned perpendicularly to each other and opposite the exhaust port 26. Again, the cost of this third cavity is either minimal or non-existant since the prior art engine also required a back cover plate.

Figure 8:
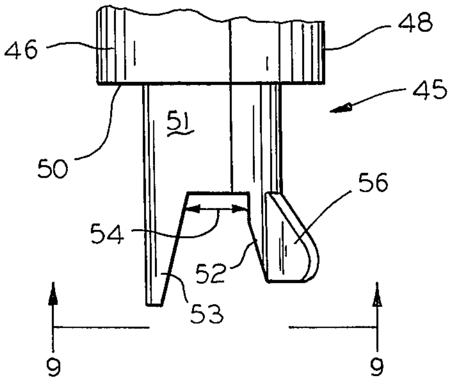
FIG. 8 is a side elevation view of a two part core used to make the cylinder and the side bypass of FIG. 3.
Figure 9:
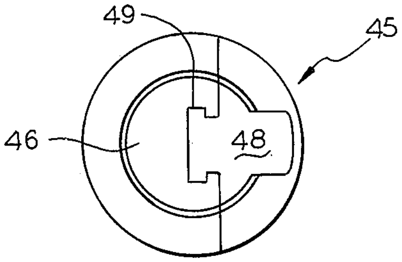
FIG. 9 is a bottom plan view taken along line 9—9 of the core of FIG. 8.

The manufacturing process should now be clear. (a) Two mold halves are closed along the parting line 38 (FIG. 1). These halves form an internal cavity having contours corresponding to the outside contours of the engine casting 20. (b) The two-section core 45 is inserted into the two closed mold halves, in the cylinder region 22. The two core sections 46, 48 are aligned as shown in FIG. 8 to form the tunnel or space 54 for receiving the core 40. (c) A bronze sleeve bearing (not shown) is slipped over shaft 67 on the core section 40 (FIG. 5) which is then inserted into the closed two mold halves and through tunnel 54 to form the crank case cavity in region 21. (d) Molten metal is placed in the closed mold cavity in a conventional die casting manner. (e) The core 40 is withdrawn. (f) The two mold halves are opened. (g) The core half 46 is raised. (h) The completed casting falls (or is pushed) off the other core half 48. Thereafter, any suitable machining is done in a conventional manner such as reaming and honing the cylinder 22, drilling and tapping holes, machining flat surfaces, and the like.

The crank case or back covering 31 is a simple die cast part. Usually there are no complexities; however, if it is necessary or desirable to provide a rear bearing support for the crank shaft, a suitable bearing may be cast or otherwise supported in the cup 65.

From the foregoing and particularly from FIG. 2, it should be apparent that the invention provides a bypass region which almost completely surrounds around the entire periphery of the piston 32. The only non-passed and unrelieved areas are those required to keep the piston 32 mechanically aligned with the cylinder.

Previous engines with three bypasses have been both expensive and complex as compared to the inventive engine. Usually, they have involved additional piece parts which must be aligned and bolted together to form the single structure seen in FIG. 1. Or, they have been expensive to make since they either required a lost core or an excessive amount of hand labor to pick loose core blocks out of the finished casting.

Those who are skilled in the art will readily perceive other advantages and modifications. Therefore, the invention is to be construed to cover all equivalent structures falling within the true scope and spirit of the invention.

I claim:

1. A unitary housing for a two-cycle engine, said unitary housing comprising a single casting having a common internal cavity wall forming the entirety of a crank case region and a cylinder region, a number of bypass regions therebetween, there being within said housing three bypass regions extending away from the cylinder in mutually perpendicular directions to form bypasses between said cylinder and crank case when a piston is furtherest withdrawn at the bottom of its stroke, a shaft bearing support region in the crank case and at the front of the housing, an opening formed in the back of the cavity wall of said housing, said opening beginning below the shaft bearing support region and extending from the crank case region through said bypass region, and removable cover means having at least part of one of said bypass cavities formed therein for covering said opening.

2. The housing of claim 1 and an exhaust port formed in said bypass region in substantial alignment with one of said bypass cavities and perpendicular to the other two of said bypass cavities.

3. The housing of claim 2 wherein said housing is a die casting having a parting plane, with said exhaust port and one of said bypass cavities being diametrically opposed from each other, extending perpendicularly to said parting plane, another of said bypass cavities and said opening in said housing being diametrically opposed from each other and lying parallel to the plane of said parting plane.

4. A two-part housing for a two-cycle engine comprising:

(a) a unitary die casting having an outside contour of the engine and an inner cavity including a cylinder region and a crank case region with a bypass region therebetween;

(b) two sections shaped to form a pair of bypass cavities extending away from the cylinder wall and located between the crank case and cylinder regions, said bypass cavities extending away from the cylinder wall in directions which are perpendicular to each other;

(c) said casting including an opening extending from the crank case to the cylinder and including the entire cross section of the crank case; and (d) a removable cover plate containing a third bypass and having a height which extends from the bottom of the crank case and over the entirety of a cross section of the crank case to a point near the bottom of the cylinder region and above the lowest point of the piston stroke.

5. The housing of claim 11 wherein said cover plate is a unitary part covering the entire opening from the crank case to the cylinder, and including the entire third bypass cavity, whereby said cover comprising a first portion for covering said crank case opening and an integral second portion for covering said third bypass cavity.

6. The housing of claim 4 wherein the contours of said internal cavity form an exhaust port diametrically opposite one of said bypass cavities.

* * * * *

UNITED STATES PATENT AND TRADEMARK OFFICE

CERTIFICATE OF CORRECTION

PATENT NO. : 3,971,297

DATED : July 27, 1976

INVENTOR(S) : Duke M. Fox

It is certified that error appears in the above-identified patent and that said Letters Patent are hereby corrected as shown below:

Column 6, claim 5, line 1, change "11" to --4--.

Signed and Sealed this

Ninth Day of November 1976

[SEAL]

*Attest:*

RUTH C. MASON
*Attesting Officer*

C. MARSHALL DANN
*Commissioner of Patents and Trademarks*